May 7, 1968   J. L. CHAPIN, JR   3,381,340
FRAMED GLAZINGS
Filed Sept. 2, 1964
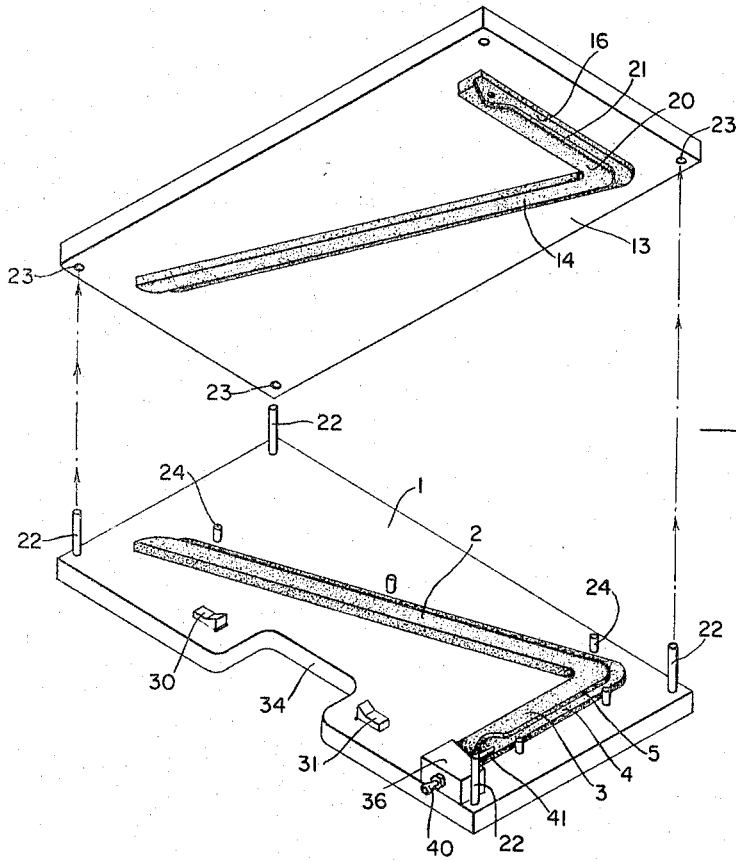
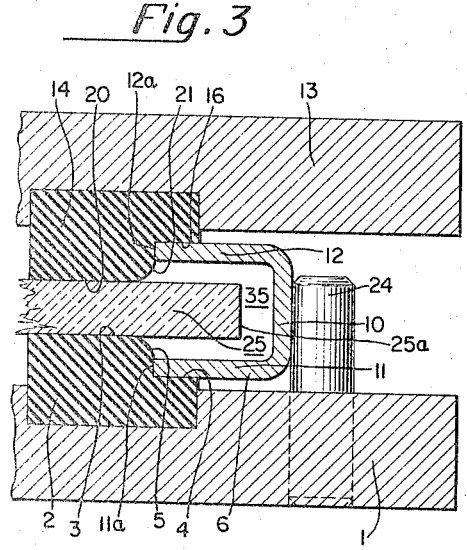
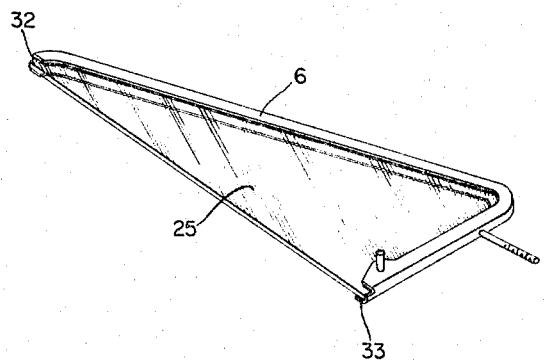
INVENTOR.
John L. Chapin, Jr.
BY
Lynnestvedt & Lechner
ATTORNEYS

3,381,340
FRAMED GLAZINGS
John L. Chapin, Jr., Penn Valley, Pa., assignor to Novo Industrial Corporation, Philadelphia, Pa., a corporation of Delaware
Filed Sept. 2, 1964, Ser. No. 393,918
5 Claims. (Cl. 18—36)

This invention relates in general to the manufacture of framed glazings and in particular relates to improvements in the bonding of a metal frame to an edge of a glass sheet.

The framed glazings of the invention are advantageously employed, for example, in passenger and commercial vehicles as ventilator windows or as rear windows in convertibles and also employed in window and door assemblies for buildings and aircraft.

Among the desirable characteristics of such framed glazings is that the joint between the metal frame and the glass be resilient so as to protect the glass against vibration and shock and that such resiliency be maintained over an extended period of time. Another desirable characteristic is that the bonding material be substantially impervious to deterioration when exposed to the elements, particularly the sun and rain. A still further characteristic is that the bonding material provides a water-tight seal. A most important quality is that the joints have superior strength characteristics, for example, requiring several hundred pounds of force to pull the glass and the frame apart.

I have found that framed glazings having the characteristics mentioned above can be produced where polysulphide synthetic rubber comprises the joint material. The invention provides a relatively simple and inexpensive way to make framed glazings having polysulphide-type joint or other type bonding material.

In one aspect, the invention contemplates the making of a framed glazing by injecting a liquid polysulphide into a closed cavity encompassing the space between a glass edge and a surrounding channel or frame and then curing the polysulphide to bond the glass and frame together, the viscosity of the polysulphide being adjusted both for injection and for desired curing rate.

In another aspect, the invention contemplates the making of a framed glazing of the kind in question by supporting a glass plate with its edge projecting into a channel-like frame, providing dams to close off the mouth of the channel whereby the channel and dams form a cavity containing the glass edge and then injecting liquid polysulphide into the cavity to be subsequently cured to bond the glass and channel together.

In another aspect the invention contemplates the making of a framed glazing of the kind in question by apparatus supporting a glass plate and an edge channel by means of resilient strips which center the edge of the glass in the channel and provide dams across the mouth of the channel so that the dams and the channel constitute a cavity for the injection of bonding material.

In another aspect the invention contemplates apparatus of the kind in question which is adaptable for the making of framed glazings have either a planar or a curved configuration.

In another aspect the invention contemplates apparatus for making framed glazings of the kind in question which is simple in structure, economical to manufacture, yet, will permit the making of framed glazings on a mass production basis.

The invention will be described below in connection with a ventilator window for vehicles. It will be understood, however, that this type of glazing is representative of the many kinds of framed glazings for which the invention is advantageously suited.

FIGURE 1 is a pictorial representation of a ventilator window constructed in accordance with the invention;

FIGURE 2 is a pictorial representation of apparatus constructed in accordance with the invention; and FIGURE 3 is a sectional, elevational view illustrating the relative positions of certain components of the apparatus of FIGURE 2 at the time the bonding material is to be placed between the channel and the edge of the glass.

The apparatus shown in FIGURE 2 is for making a vent of the kind illustrated in FIGURE 1. The apparatus has a frame 1 formed with an elongated slot in which is disposed a resilient strip 2. The resilient strip 2 is made from silicone rubber principally because it is incompatible with other synthetic rubber and this prevents the adhesion of the bonding material on the same. The strip 2 has an upper support surface 3 and a lower support surface 4. The two surfaces are joined by an intermediate surface 5. These surfaces are shown in an enlarged form in FIGURE 3. The overall length of the resilient strip 2 is dictated by the length of the metal channel such as the channel 6 on the vent V of FIGURE 1.

The channel 6 is of usual form (see FIGURE 3) having bottom 10 and side walls 11 and 12.

A second frame 13 is shown disposed above the frame 1 and this is constructed similarly as the frame 1. A resilient strip 14 which is substantially a mirror image of the strip 2 is removably supported in an elongated slot in the frame 13. The strip 14 has a lower surface 16 which corresponds with the lower surface 4, an upper surface 20 which corresponds with the upper surface 3 and an intermediate surface 21 which corresponds with the intermediate surface 5.

The frame 1 is provided with locating pins 22 which are adapted to fit into the holes 23 in the frame 13. The frame 13 can be brought down and placed on the pins and this locates the strips 2 and 14 in the desired position. This is shown in FIGURE 2 where it will be seen that the frame 13 is in juxtaposition over the frame 1 with the corresponding surfaces of the strips 2 and 14 facing one another.

The frame 1 is also provided with several pins 24 which are spaced closely adjacent to the strip 2. These pins are for purposes of supporting and locating the channel 6.

In setting up the apparatus for the bonding operation, the edge of a sheet-like piece of glass (such as the glass 25 of FIGURE 1) is placed in the channel 6 and then the assembly is set on the frame 1 with the side wall 11 of the channel resting on the surface 4 and the bottom 10 of the channel abutting the pins 24 (see FIGURE 3). The lower surface of the glass 25 rests on the surface 3. Also, it will be noted that the edges 11a and 12a of the side walls abut the intermediate surfaces 5 and 21. The intermediate surfaces 5 and 21 and the pins 24 cooperate in positioning the channel 6 laterally. Also, the pins 24 can prevent the channel from moving away from the glass if pressure should be built up when the bonding material is introduced.

The locating fingers 30 and 31 (which are pivotally mounted on the frame 1) are then rotated upwardly and the glass pulled back against the fingers. This spaces the edge 25a (FIGURE 3) of the glass from the bottom 10 of the channel. Further spacing adjustment is accomplished simply by looking at the ends 32 and 33 of the glass (FIGURE 1) to be sure that the spacing from the bottom of the channel is even. The glass can be shifted back and forth for making this adjustment. It will be observed that the frame 1 is cut out at 34 so that the fingers can grip the glass. The fingers 30 and 31 are then swung down on the frame.

After the glass and channel are set up as described, the frame 13 is brought down on the pins 22 to the position shown in FIGURE 3. At this point, it will be noted that the surface 16 of the upper strip 14 is engaged with the side wall 12 of the channel and that the surface 20 of the upper strip 14 is engaged with the top surface of the glass.

The top surfaces 3 and 20 of the resilient strip support the glass so that the edge is approximately centered as between the side walls 11 and 12.

Also it will be observed that the intermediate surfaces 5 and 21 on the strips respectively extend from a glass surface to the edge of the channel. The intermediate surfaces form dams. Thus, a cavity 35 is created which is formed by the channel 6 and the dams 5 and 21.

In most instances the weight of the frame 14 will provide sufficient force so that the glass and channel are gripped between the resilient strips with the desired pressure. In other instances, suitable forces can be provided either by weights or a pressure created by the hydraulic cylinder acting on the frame 13.

The bonding material is injected into the cavity in a fluid condition. For this purpose, I have provided a header 36 which is fixed to the frame 1. A fitting 40 is threaded into the header. The fitting carries a tubular element 41 which can extend into the cavity when the fitting is threaded up as shown. For setting up the assembly as shown in FIGURE 2, the fitting 40 and its tube 41 are removed then replaced after set up so that the tube extends down into the cavity 35.

After the apparatus is set up as described, a pressure gun is connected to the fitting 40 and the bonding material injected through the fitting and tube 41 into the cavity. The injection is carried out until the material begins to ooze out of the end 32.

After the cavity filling has been completed as mentioned above, the apparatus is put in a heated chamber where the curving takes place at a rapid rate. After curing, the window vent assembly is taken out and any flash is cut from the ends 32 and 33.

The liquid polysulphide used as the bonding agent is conventional except that I have adjusted the filler content to obtain a viscosity of optimum injection rate and cavity filling characteristics. Additionally, the kind and quantity of filler material is adjusted to control the curing time to fit the particular production rate. It will be understood, of course, that the kind of filler material and its quantity are arranged so that viscosity and curing rates are desirably compatible. As a typical example of polysulphide material which I have successfully employed, reference is made to polysulphide PR-255 made by the Products Research Company of Camden, N.J.

The resilient strips 2 and 14 are made by conventional moulding techniques. Preferably this comprises making a master framed glazing, supporting the same between the two halves of a mould and then filling the cavities between the master and the mould halves with silicone rubber. This produces a pair of strips each having the exact desired configuration.

The apparatus described above is especially advantageous in that it is readily adaptable for the making of curved glazings. A typical example of such glazings is found in the ventilator windows used on some of the current sports cars. The curvature makes it very difficult to produce a water-tight glazing with conventional techniques. However, this poses no problem for my invention because the moulding technique for making the resilient strips insures that they conform exactly and precisely to the curvature of the glass and the channel. In producing curved glazings, the strips perform the holding and damming functions with the same facility as they do in producing planar type glazings.

Before closing it is pointed out that although I have described the invention in terms of bonding a channel to a glass piece, it will be understood that the invention contemplates the bonding of a channel to the edge of other types of sheet-like pieces. Furthermore, it will be understood that the term "sheet-like" is inclusive of pieces which are either planar or curved.

I claim:
1. Apparatus for use in bonding a channel to the edge of a sheet-like piece comprising:
   a pair of facing, spaced-apart, resilient strips each having means to engage the opposite faces of a sheet-like piece and also to engage the opposite side walls of a channel to support the piece with the edge of the piece projecting into the channel and with a portion of each strip extending between a surface of the piece and the edge of the channel to form a dam, the dams and the inside of the channel constituting a cavity surrounding the edge and adapted to receive a liquid bonding material for bonding the piece and the channel together.

2. Apparatus for use in bonding a channel to the edge of a sheet-like piece:
   a first frame;
   a resilient strip mounted in said frame, the strip being formed with a pair of support surfaces spaced from one another in plan and in elevation and the strip being formed with an intermediate surface connecting the support surfaces;
   a second frame;
   a second resilient strip mounted in said second frame, the strip being formed with a pair of support surfaces spaced from one another in plan and in elevation and the strip being formed with an intermediate surface connecting the support surfaces;
   means positioning the frames with the strips facing one another;
   in such position, two of the facing strip surfaces being adapted to support a channel therebetween and the other two being adapted to support a sheet-like piece therebetween with the edge of the piece extending into the channel and spaced from the bottom thereof and the support surfaces for the piece and for the channel being located to center said edge as between the side walls of such channel, and in said position each intermediate surface extending between a surface of the piece and the edge of the channel and constituting a dam, the dams and the inside of such channel forming a cavity to receive material to bond the edge to the channel; and
   injection mechanism including tubular means for extending into said cavity for injecting the bonding material in fluid condition.

3. A construction in accordance with claim 2 wherein each said frame is formed with an elongated slot and said strips are respectively removably mounted in the slots.

4. A construction in accordance with claim 2 where said injection mechanism is constructed as by a header connected with one of the frames and mounting a removable fitting and injection tube.

5. A construction in accordance with claim 2 further including a plurality of pins connected with one of said frames and adapted to engage the bottom of a channel supported between said surfaces.

References Cited
UNITED STATES PATENTS

| | | | |
|---|---|---|---|
| 2,718,664 | 9/1955 | Schweitzer | 18—36 XR |
| 3,263,014 | 7/1966 | Deisenroth | 264—261 |

EARL M. BERGERT, *Primary Examiner.*

H. F. EPSTEIN, *Assistant Examiner.*